(12) United States Patent
Halbur et al.

(10) Patent No.: US 7,717,335 B2
(45) Date of Patent: May 18, 2010

(54) FINGER PUPPET STORED-VALUE CARD

(75) Inventors: Ted C. Halbur, Lino Lakes, MN (US); Travis M. Robertson, St. Louis Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 339 days.

(21) Appl. No.: 11/542,553

(22) Filed: Oct. 3, 2006

(65) Prior Publication Data

US 2008/0078832 A1    Apr. 3, 2008

(51) Int. Cl.
*G06K 19/00* (2006.01)
(52) U.S. Cl. .................................. 235/380; 235/487
(58) Field of Classification Search ................ 235/380, 235/487, 489
See application file for complete search history.

(56) References Cited

U.S. PATENT DOCUMENTS

| | | | |
|---|---|---|---|
| 502,896 A | 8/1893 | Vine | |
| 976,495 A | 11/1910 | Reeves | |
| 2,392,991 A | 1/1946 | Macomber | |
| 4,100,689 A * | 7/1978 | Broune | 283/73 |
| 4,326,356 A | 4/1982 | Mason | |
| 4,555,236 A | 11/1985 | Peyton | |
| 4,869,702 A | 9/1989 | Derby, III | |
| 4,880,404 A | 11/1989 | Derby, III | |
| D305,887 S | 2/1990 | Nishimura | |
| 5,326,964 A * | 7/1994 | Risser | 235/487 |
| 5,777,305 A * | 7/1998 | Smith et al. | 235/380 |
| 5,848,928 A | 12/1998 | Wong | |
| 5,982,736 A | 11/1999 | Pierson | |
| 6,016,298 A | 1/2000 | Fischer | |
| 6,024,578 A * | 2/2000 | Dandl | 434/347 |
| D429,733 S | 8/2000 | Jones et al. | |
| D436,991 S | 1/2001 | Morgante | |
| 6,386,457 B1 | 5/2002 | Sorie | |
| 6,400,675 B1 | 6/2002 | Everidge et al. | |
| 6,484,940 B1 * | 11/2002 | Dilday et al. | 235/454 |

(Continued)

FOREIGN PATENT DOCUMENTS

GB    1594584 A  *  7/1981

(Continued)

OTHER PUBLICATIONS

Paper Finger Puppets available at www.enchantedlearning.com/crafts/puppets/twofinger/ at least as early as Jan. 28, 1999 (date based on web.archive.org) (3 pgs.).

(Continued)

*Primary Examiner*—Thien M Le
(74) *Attorney, Agent, or Firm*—Griffiths & Seaton PLLC

(57) ABSTRACT

A stored-value card includes a substrate including an account identifier and a graphical depiction of a character. The account identifier links the stored-value card to at least one of a financial account and a financial record. The substrate defines an aperture configured to receive a portion of a finger of a card bearer. The aperture is positioned relative to the character such that, when the finger is received by the at least one aperture, the finger appears as an appendage of the character. Methods of encouraging purchase and facilitating use of a stored-value card, and other stored-value card embodiments are also disclosed.

40 Claims, 6 Drawing Sheets

U.S. PATENT DOCUMENTS

| | | | |
|---|---|---|---|
| 6,510,124 | B1 | 1/2003 | Wood |
| 6,561,420 | B1 | 5/2003 | Tsai et al. |
| 6,561,657 | B1 | 5/2003 | Schofield |
| 6,575,835 | B1 | 6/2003 | Mishina et al. |
| 6,666,378 | B2 | 12/2003 | Davila et al. |
| 6,684,197 | B1 | 1/2004 | Kolls |
| 6,685,477 | B1 * | 2/2004 | Goldman et al. ............ 434/172 |
| 6,715,795 | B2 | 4/2004 | Klure |
| 6,749,114 | B2 | 6/2004 | Madani |
| D502,213 | S | 2/2005 | Prescott et al. |
| 6,910,627 | B1 | 6/2005 | Simpson-Young et al. |
| 6,929,526 | B1 * | 8/2005 | Cole et al. .................. 446/327 |
| 7,055,740 | B1 | 6/2006 | Schultz et al. |
| 7,252,225 | B2 | 8/2007 | Schultz et al. |
| 7,264,155 | B2 | 9/2007 | Halbur et al. |
| 2002/0017759 | A1 | 2/2002 | McClung, III et al. |
| 2002/0066789 | A1 | 6/2002 | Yen |
| 2002/0143697 | A1 | 10/2002 | Gotfried |
| 2002/0182975 | A1 * | 12/2002 | Schaffer ..................... 446/327 |
| 2003/0004889 | A1 | 1/2003 | Fiala et al. |
| 2003/0022586 | A1 | 1/2003 | Beged-Dov |
| 2003/0132300 | A1 | 7/2003 | Dilday et al. |
| 2003/0155425 | A1 | 8/2003 | Lynch |
| 2004/0046035 | A1 | 3/2004 | Davila et al. |
| 2004/0064364 | A1 | 4/2004 | Toyooka |
| 2004/0182940 | A1 | 9/2004 | Biller |
| 2005/0061889 | A1 | 3/2005 | McGee et al. |
| 2005/0184164 | A1 | 8/2005 | deJong |
| 2006/0157554 | A1 | 7/2006 | Halbur et al. |
| 2007/0241198 | A1 | 10/2007 | Halbur et al. |
| 2008/0217401 | A1 | 9/2008 | Birkeland et al. |

FOREIGN PATENT DOCUMENTS

| | | |
|---|---|---|
| GB | 2 277 482 | 11/1994 |
| GB | 2277482 A | 11/1994 |

OTHER PUBLICATIONS

The Gingerbread Boy-Finger Puppets available at www.longman-elt.com/young_learners/primary/storytemplate.html at least as early as Apr. 27, 2001 (date based on web.archive.org) (2 pgs.).

"Best Buy CD Cardz," http://www.serious.com/projBestBuy, Nov. 9, 2004, 2 pages.

"EFT Direct, MonetaOne Multimedia Gift Card," http://web.archive.org/web/20020808051140/http://www.eft-direct.com/multimedia.html, Aug. 8, 2002, 4 pages.

Michigan Technology News, Xenaga Offers DC Gift Card; Could close Deal with NASCAR, http://64.233.167.104/search?q=cache:ax1L0PJ_16oJ:www.mitechnews.com/technews/entr..., Mar. 12, 2003, 4 pages.

"One28 Marketing Group, LLC Introduces First Multimedia Gift Card™ on the Market," http://www.one28marketing.com/pressrelease/june_15_2004.html, Jun. 15, 2004, 3 pages.

The X-Card, http://web.archive.org/web/20040202033945/www.xenaga.com, available as early as Dec. 14, 2003 per the Internet Archive available at www.archive.org, 4 pages.

* cited by examiner

FINGER PUPPET STORED-VALUE CARD

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a stored-value card including a substrate. The substrate includes an account identifier and a graphical depiction of a character. The account identifier links the stored-value card to at least one of a financial account and a financial record. The substrate defines an aperture configured to receive a portion of a finger of a card bearer. The aperture is positioned relative to the character such that, when the finger is received by the at least one aperture, the finger appears as an appendage of the character. Methods of encouraging purchase and facilitating use of a stored-value card, and other stored-value card embodiments are also disclosed. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services at, for example, a retail store or website. According to one embodiment, an original consumer buys a stored-value card to give a recipient who in turn is able to use the stored-value card at a retail store or setting to pay for goods and/or services. A stored-value card, according to embodiments of the present invention, provides the consumer and recipient with extra amusement in addition to the ability to pay for goods and/or services with the stored-value card.

In particular, the stored-value card depicts a character and includes at least one aperture extending through or positioned adjacent the character. The aperture is sized to receive at least a portion of a finger of a bearer of the stored-value card such that when the finger of the bearer is placed through the aperture, the finger appears as an animated portion or appendage of the character depicted on the stored-value card. As such, the stored-value card also functions as a finger puppet. In one embodiment, this amusing aspect of the stored-value card promotes the sale, use, and/or loading of the stored-value card by potential consumers and/or bearers of the stored-value card.

Figure 1:
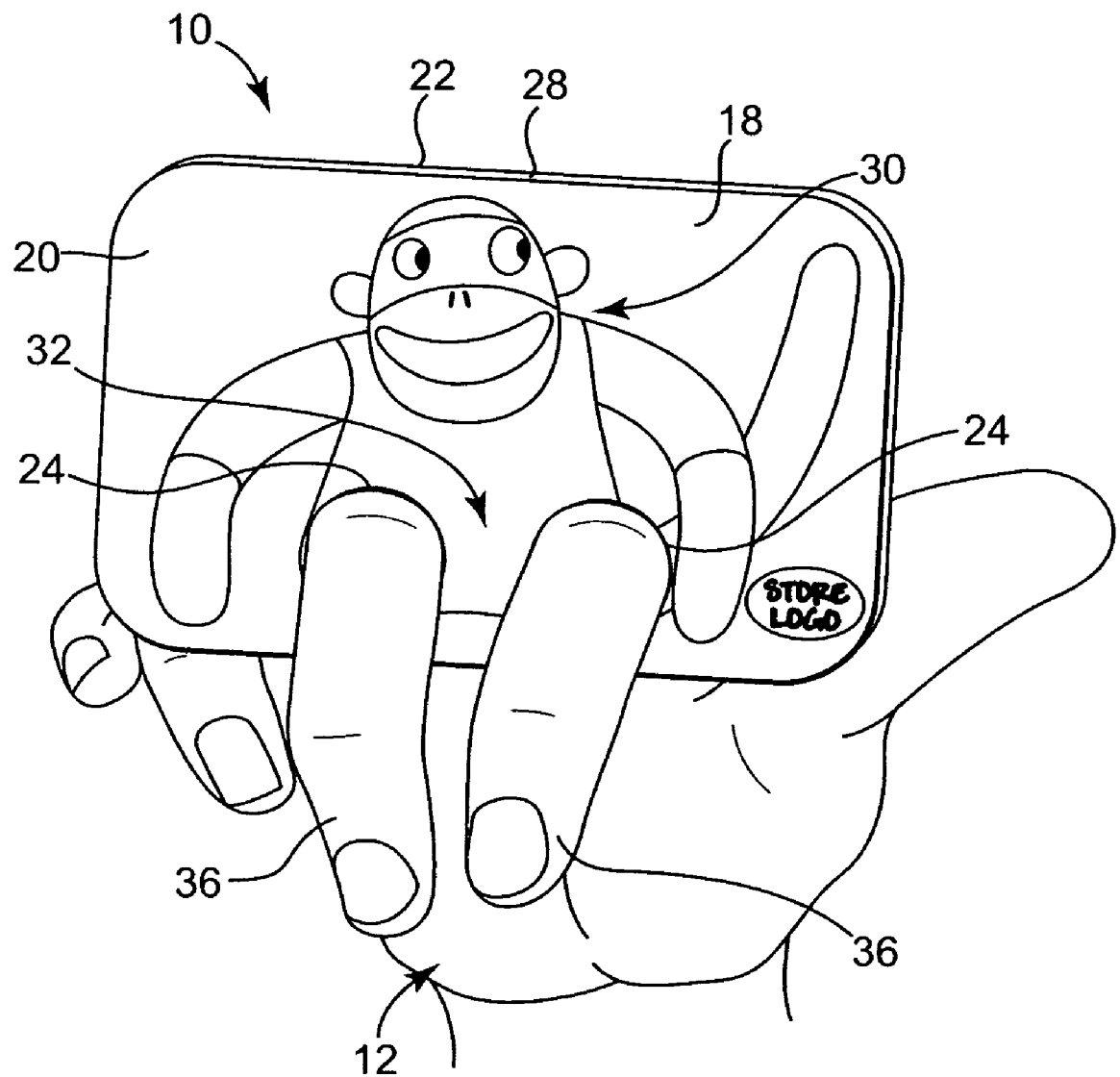
FIG. 1 is a perspective view illustration of one embodiment of a stored-value card and a hand of a card bearer, according to the present invention.

Turning to the figures, FIG. 1 illustrates a perspective view of one embodiment of a stored-value card 10 and a hand 12 of a bearer of stored-value card 10. Stored-value card 10 includes a substrate 18 defining a first surface 20, a second surface 22 opposite first surface 20, and at least one aperture or opening 24 extending therethrough. In one embodiment, at least one of first and second surfaces 20 and 22 is substantially planar.

In one embodiment, stored-value card 10 is generally rectangular in shape and is of a size similar to that of an identification card, a credit card, or other card sized to fit in a wallet of a card bearer (i.e. wallet sized). In particular, in one embodiment, stored-value card 10 is about 8.5 cm long, about 5.5 cm wide, and less than about 1 mm thick. In other embodiments, stored-value card 10 is otherwise shaped as a square, circle, oval, star, or any other suitable shape defining an outer perimeter 28. Stored-value card 10 is formed of a somewhat rigid yet flexible material similar to that commonly used for identification cards, credit cards, etc. More specifically, in one embodiment, stored-value card 10 is formed of paper, cardstock, plastic, e.g. polycarbonate, polystyrene, or polyvinyl chloride (PVC), or other suitable material. In one embodiment, stored-value card 10 is formed of injected molded plastic or cut from sheet-stock plastic material. Stored-value card 10 can be formed in any other suitable planar or non-planar configuration as will be apparent to those of skill in the art upon reading this application.

Figure 2A:
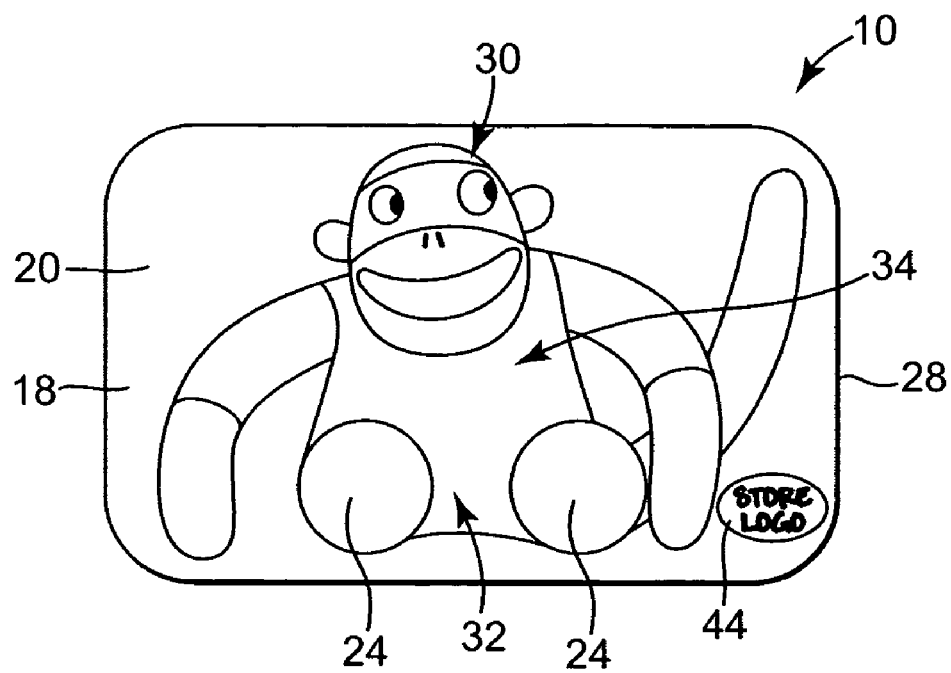
FIG. 2A is a top view illustration of one embodiment of the stored-value card of FIG. 1, according to the present invention.

With additional reference to FIG. 2A, in one example, first surface 20 includes a graphical depiction of a character 30 such as an animal, toy, person, a fictional being (for example, a cartoon character or other fictional character), or other suitable subject. As such, substrate 18 with character 30 is one example of means for depicting a subject or character. The at least one aperture 24 extends through or is positioned adjacent a portion 32 of character 30 relating to an appendage of the depicted character 30. For example, portion 32 may include a joint or otherwise be adjacent to an area in which the appendage would be expected to extend from a main body portion 34 of character 30. In one embodiment, the appendage itself is not depicted. In one example, the at least one aperture is two apertures 24 each positioned to correspond with an expected position of a different appendage of character 30.

For example, as illustrated in FIGS. 1 and 2, character 30 is a sock monkey or other monkey, and two apertures 24 are included. Each aperture 24 is positioned to correspond with the expected position of one of the two legs of the monkey character 30. In one example, each aperture 24 defines a diameter of at least 1.5 cm.

Figure 2B:
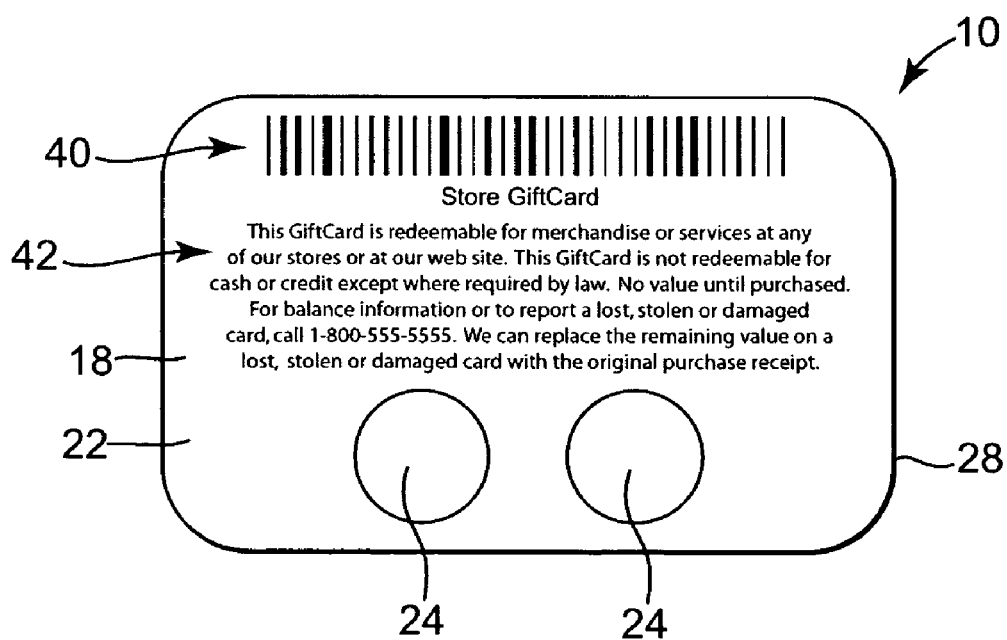
FIG. 2B is a bottom view illustration of the stored-value card of FIG. 2A, according to the present invention.

Due to the position and size of the at least one aperture 24, a finger 36 of the bearer of stored-value card 10 can be positioned to extend through each aperture 24 of stored-value card 10 to appear as an appendage or other animated portion of character 30. More particularly, human fingers 36 are inserted from second surface 22 through apertures 24 and beyond first surface 20 and character 30 depicted thereon. Accordingly, movement of fingers 36 generally appears as movement of character 30 appendages, which, in turn, appears to animate the character 30 at least in part. For example, where character 30 is a monkey and two apertures 24 correspond with portion 32 of monkey character 30 associated with the two legs of character 30, fingers 36 extend through stored-value card 10 to appear as the legs of monkey character 30. In this manner, positioning of fingers 36 through apertures 24 amuses the card bearer and any other observers of fingers 36 and stored-value card 10. As illustrated in FIGS. 1, 2A and 2B, in one embodiment, each aperture 24 is positioned off-center (i.e., in a non-centered position) relative to an overall length and an overall width of stored-value card 10, more particularly, substrate 18. In one example, apertures 24 are collectively positioned off-center relative to at least one of the overall length and the overall width of substrate 18.

Upon reading this application, other depictions of characters 30 and locations and numbers of apertures 24 will be apparent to those of skill in the art. For example, the depicted character may be an elephant and a single aperture may be positioned to correspond with a trunk of the elephant, the depicted character may be a four-legged animal such as a dog and a plurality of apertures may be positioned to align with one or more of the legs and/or of the tail of the dog, etc.

Referring to FIGS. 2A and 2B, stored-value card 10 includes an account identifier 40, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 40 is printed on or otherwise applied to second surface 22 of stored-value card 10. Account identifier 40 indicates a financial account or record to which stored-value card 10 is linked. The financial account or record of the monetary balance on stored-value card 10 optionally is maintained on a database, other electronic or manual recordkeeping system, or, in the case of "smart" cards for example, on a chip or other electronic device on/in stored-value card 10 itself. Accordingly, by scanning account identifier 40, a financial account or record linked to stored-value card 10 is identified and can subsequently be activated, have amounts debited therefrom, and/or have amounts credited thereto. Account identifier 40 is one example of means for linking stored-value card 10 with a financial account or a financial record.

In one embodiment, redemption indicia 42 are included on stored-value card 10 such as on second surface 22 of stored-value card 10. Redemption indicia 42 indicate that stored-value card 10 is redeemable for the purchase of goods and/or services and that, upon use, a value of the purchased goods and/or services will be deducted from the financial account or record linked to stored-value card 10. In one embodiment, redemption indicia 42 include phrases such as "<NAME OF STORE> GiftCard" and "This GiftCard is redeemable for merchandise or services at any of our stores or at our website," and/or provides help or phone line information in the case of a lost, stolen, or damaged stored-value card, etc. In one embodiment, other indicia 44 are also included on first or second surfaces 20 and 22 including other objects, texts, backgrounds, graphics, brand or store identifiers, etc.

Figure 3A:
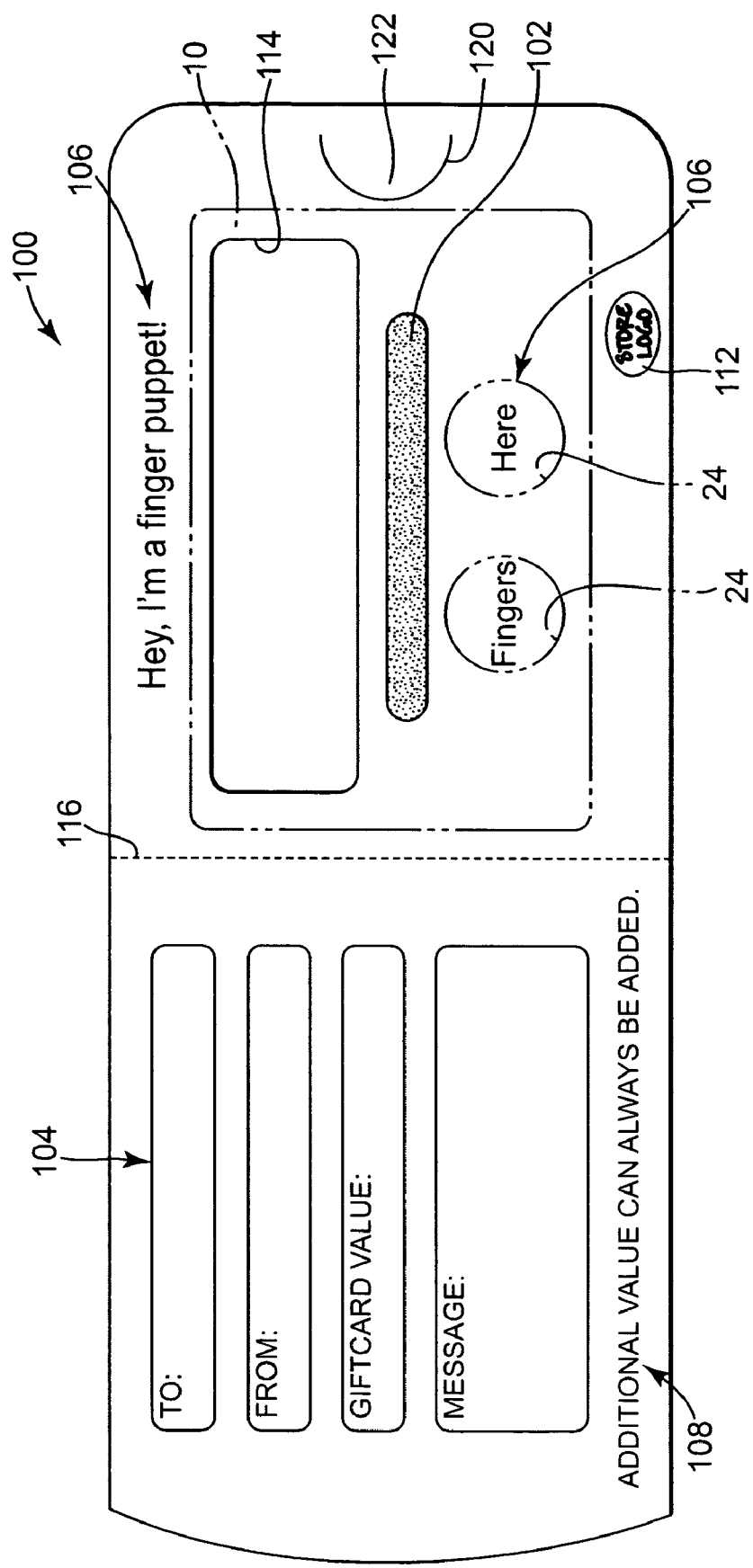
FIG. 3A is a top view illustration of one embodiment of an unfolded backer for a stored-value card, according to the present invention.
Figure 3B:
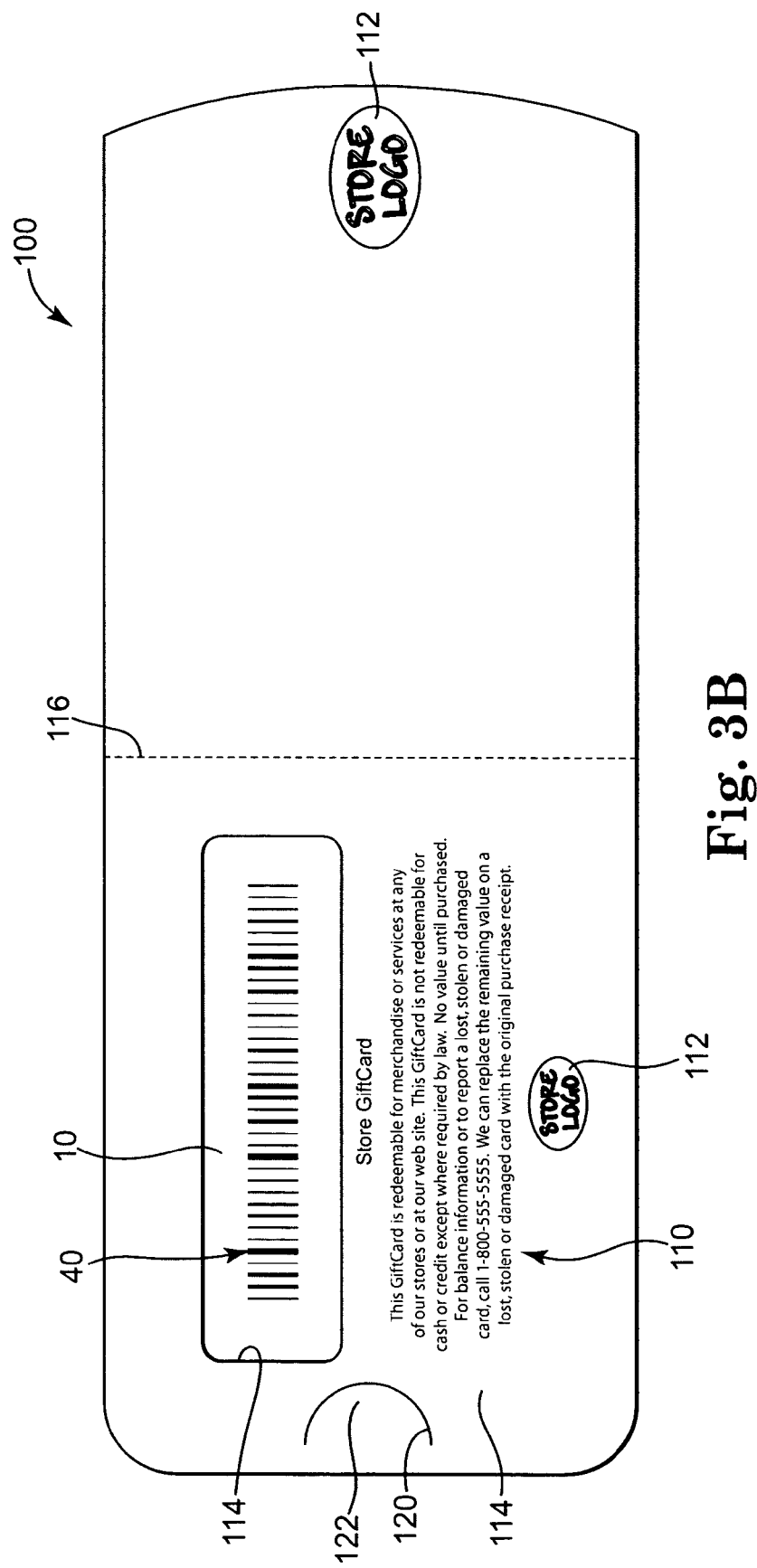
FIG. 3B is a bottom view illustration of the unfolded backer of FIG. 3A with a stored-value card, according to the present invention.

FIGS. 3A and 3B illustrate a carrier or backer 100 for supporting stored-value card 10. Stored-value card 10, which is represented in phantom lines in FIG. 3A, is readily releasably attached to backer 100, for example by an adhesive 102 or the like. Backer 100 comprises a single layer or multiple layers of paper or plastic material, for example, generally in the form of a relatively stiff but bendable/flexible card. Use of other materials is also contemplated. Backer 100 displays indicia, graphics or text information including store logo(s), store name(s), slogans, advertising, instructions, directions, brand indicia, promotional information, holiday indicia, seasonal indicia, media format identifiers, characters, and/or other information.

Indicia 104, for example, include to, from, initial gift card value, and message fields. The fields of indicia 104 provide areas of backer 100 configured to be written upon by a consumer to personalize backer 100 for presentation as a gift to a particular recipient, for a particular purpose, and/or to indicate a value of stored-value card 10.

Indicia 106 promote that stored-value card 10 can be used as a finger puppet. In one example, indicia 106 state "Hey, I'm a finger puppet!" In one example, indicia 106 additionally instruct the bearer of store-value card 10 on how to use stored-value card 10 for amusement. For example, indicia 106 may include instructions such as "fingers here" on backer 100 in a position corresponding with the position of the one or more apertures 24 (generally indicated in phantom lines in FIG. 3A) of stored-value card 10 when stored-value card 10 is coupled with backer 100. As such, at least a portion of indicia 106 is viewable through apertures 24 when stored-value card 10 is coupled with backer 100. Indicia 108 notify a user and promote that additional value can always be added to or reloaded to stored-value card 10.

Referring to FIG. 3B, indicia 110 indicate that stored-value card 10 is redeemable for the purchase of goods and/or services and that upon use, a value of the purchased goods and/or services will be deducted from the financial account or record linked to stored-value card 10. In one embodiment, indicia 110 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc. Brand indicia 112 identify a store, brand, department, etc. and/or services associated with stored-value card 10. Any of indicia 42 (FIG. 2B), 44 (FIG. 2A), 104, 106, 108, 110, 112, or other indicia optionally may appear anywhere on backer 100 or stored-value card 10. Additional information besides that specifically described and illustrated herein may also be included and/or one or more of indicia 42, 44, 104, 106, 108, 110, and 112 may be eliminated.

Backer 100 includes a window or opening 114 for displaying account identifier 40 of stored-value card 10 through backer 100 as illustrated in FIG. 3B. As previously described, account identifier 40 is adapted for accessing a financial account or a financial record associated with stored-value card 10 for activating, loading, or debiting from the financial account or financial record. Accordingly, window 114 allows viewing or other access to account identifier 40 to activate and/or load stored-value card 10 without removing stored-value card 10 from backer 100. In one embodiment, a portion of backer 100 alternatively is configured to be folded away from the remainder of backer 100 to access account identifier 40 without removing stored-value card 10 from backer 100.

In one embodiment, backer 100 is a bi-fold substrate defining a fold line 116, about which backer 100 is foldable roughly in half. In FIGS. 3A and 3B, backer 100 is unfolded, i.e. is in an open configuration. According to one embodiment, FIG. 3A illustrates surfaces of backer 100 that will be supported on a rack or other fixture to be visible to a consumer of a retail store who is considering the purchase of stored-value card 10. In another example, while on display in a retail store, backer 100 is folded back about fold line 116 to present only the surfaces of backer 100 illustrated in FIG. 3A that are positioned on the same side of fold line 116 as stored-value card 10 to a consumer. In such an embodiment, indicia 104 and 108 would not be visible to a consumer when backer 100 and stored-value card 10 are placed for display in a retail store. Backer 100 is one example of means for supporting stored-value card 10 for display in a retail setting.

After purchase, backer 100 is foldable about fold line 116 such that the FIG. 3A surfaces of backer 100 are folded toward each other and stored-value card 10 is enclosed or wrapped in a compact package formed by foldable backer 100. In this manner, the surfaces of backer 100 illustrated in FIG. 3B are disposed toward the outside of the folded, compact package, according to embodiments of the invention. In one embodiment, folded backer 100 effectively wraps stored-value card 10 for presentation from a consumer to a recipient. Folding backer 100 in the other direction about fold line 116 for display on a rack in a retail setting, or about other fold lines of backer 100 is also contemplated.

In one embodiment, a cut 120 is formed through backer 100 near an edge of backer 100 spaced from and substantially parallel to fold line 116. Cut 120 extends partially toward fold line 116 and defines a flap 122, which can be partially bent away from the remainder of backer 100. More specifically, upon folding of backer 100 about fold line 116 to close backer 100 around stored-value card 10, an opposing edge of backer 100 is tucked beneath flap 122 to maintain backer 100 in a folded or closed position. In one embodiment, cut 120 and thereby flap 122 are each substantially semi-circular in shape. Other backers similar to backer 100 can be used having various sizes and shapes for supporting stored-value card 10.

Figure 4:
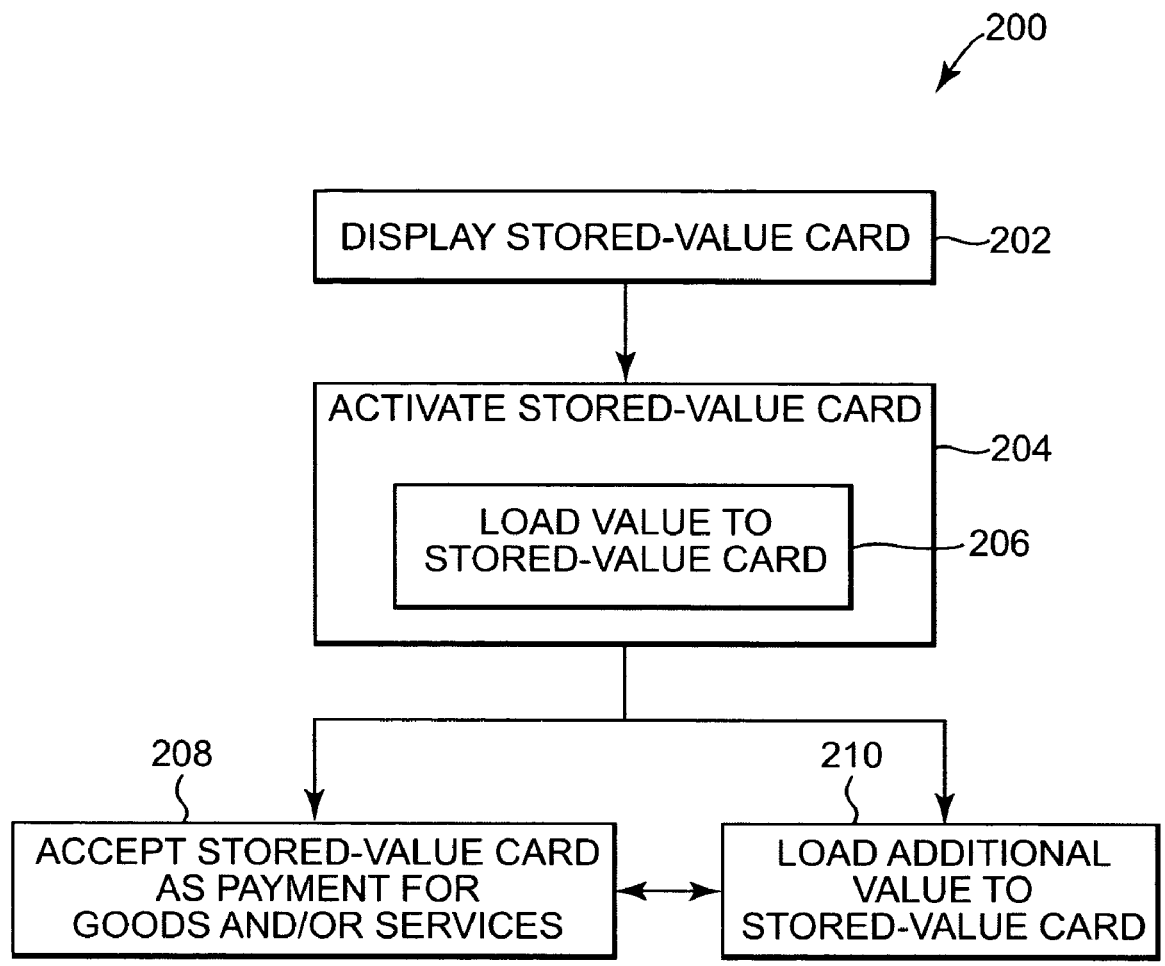
FIG. 4 is a flow chart illustrating one embodiment of a method of encouraging purchase and facilitating use of a stored-value card assembly, according to the present invention.

FIG. 4 is a flow chart illustrating one embodiment of a method 200 of encouraging purchase and facilitating use of stored-value card 10 by consumers. At 202, stored-value card 10 is placed or hung from a rack, shelf, or other similar device to display stored-value card 10 for sale to potential consumers. In one example, stored-value card 10 is placed for retail sale when assembled to backer 100. In one embodiment, a depiction of stored-value card 10 is placed on website for viewing and purchase by potential consumers. In one embodiment, stored-value card 10 is displayed without backer 100.

At 204, a consumer who has decided to purchase stored-value card 10 presents the stored-value card 10 on backer 100 to a retail store employee, retail store kiosk, remote terminal, or other person or device to scan account identifier 40 to access a financial account or financial record linked to account identifier 40. In particular, account identifier 40 is scanned or otherwise accessed through window 114 of backer 100. Upon accessing the financial account or financial record, at 206, value is added to the financial account or financial record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website. In one embodiment where stored-value card 10 is displayed on a website at 202, then at 204 stored-value card 10 may be activated in any suitable method and may not require the physical scanning of account identifier 40 to be activated or to otherwise access the associated financial account or record such as at 206.

At 208, the retail store or other affiliated retail setting or website accepts stored-value card 10 as payment towards the purchase of goods and/or services made by the current bearer of stored-value card 10. In particular, the value currently loaded on stored-value card 10 (i.e. stored or recorded in the financial record or account linked to account identifier 40) is applied towards the purchase of goods and/or services. At 210, additional value is optionally loaded on stored-value card 10 at a point of sale terminal, kiosk, or other area of the retail store or related setting. Upon accepting stored-value card 10 as payment at 208, the retail store or related setting can subsequently perform either operation 208 or operation 210 as requested by a current bearer of stored-value card 10. Similarly, upon loading additional value on stored-value card 10 at 210, the retail store or related setting can subsequently perform either operation 210 again or operation 208. In one example, the ability to accept stored-value card 10 as payments for goods and/or services is limited by whether the financial account or financial record associated with stored-value card 10 has any value stored or recorded therein at the time of attempted redemption.

Figure 5:
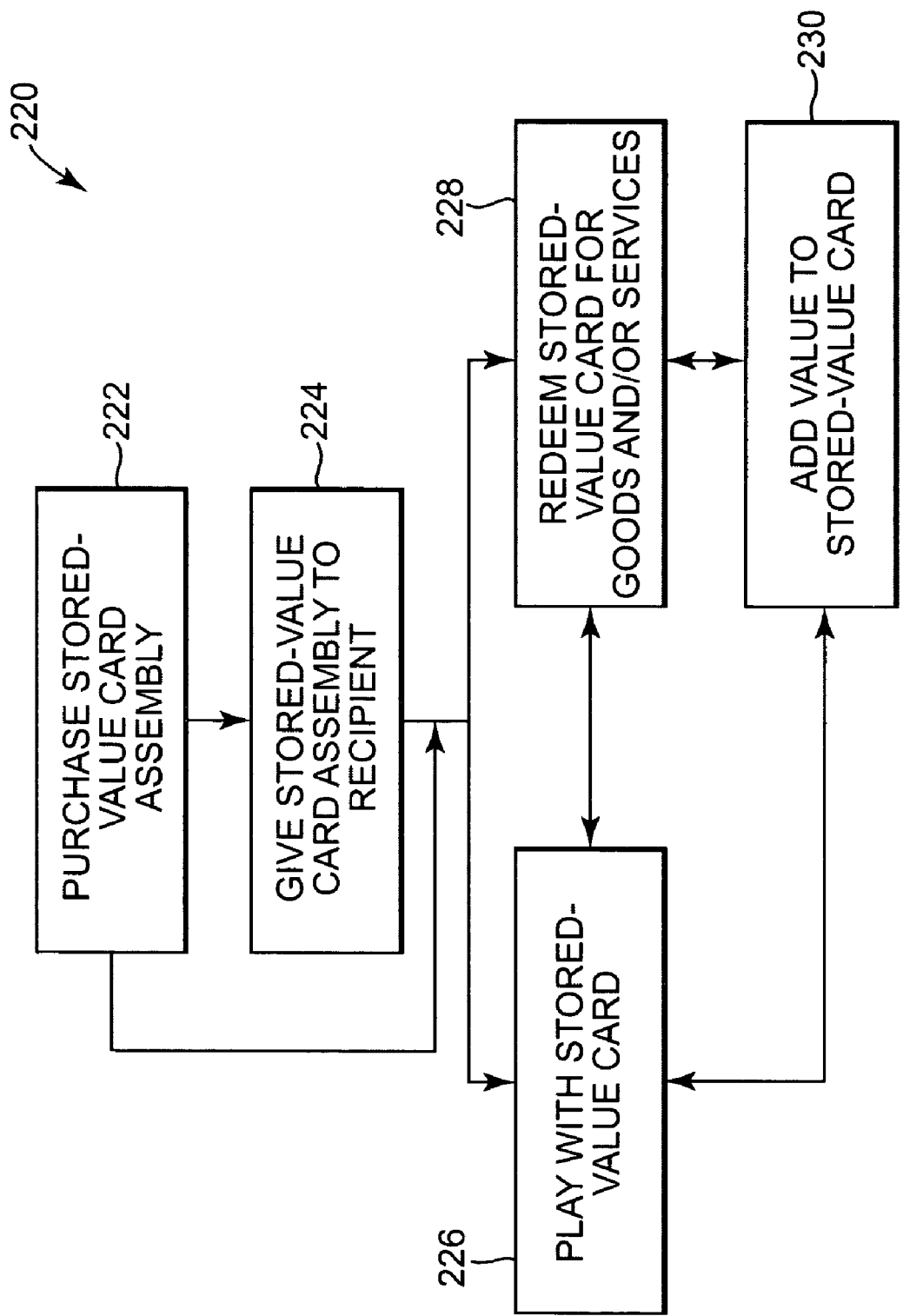
FIG. 5 is a flow chart illustrating one embodiment of a method of using a stored-value card assembly, according to the present invention.

FIG. 5 is a flow chart illustrating one embodiment of a method 220 of using stored-value card 10 (FIG. 1). At 222, a potential consumer of stored-value card 10, which is displayed in a retail store or viewed on a website, decides to and does purchase stored-value card 10 from the retail store or website. Stored-value card 10 can be displayed and purchased alone or as part of a retail product along with backer 100 (FIGS. 3A and 3B). Upon purchasing a stored-value card 10, a retail store employee, a retail store kiosk, or other person or device scans account identifier 40 (FIG. 2B) through window 114 of backer 100. Upon scanning account identifier 40, the financial account or record linked to account identifier 40 is accessed and activated to load value onto stored-value card 10. In one embodiment, such as where stored-value card 10 is purchased at 222 via a website, actual scanning of account identifier 40 may be eliminated.

At 224, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 224.

At 226, the consumer or recipient, whoever is in current ownership or otherwise is the current bearer of stored-value card 10, removes stored-value card 10 from backer 100 if stored-value card 10 is coupled with backer 100. The current bearer of stored-value card 10 can play with stored-value card 10 by placing his/her fingers 36 through apertures 24 such that fingers 36 appear as appendages or other animated portions of character 30 depicted on stored-value card 10 as illustrated in FIG. 1. As such, the bearer is amused by stored-value card 10.

At 228, the current bearer of stored-value card 10 redeems stored-value card 10 for goods and/or services from the retail store or website. At 230, the current bearer of stored-value card 10 optionally adds value to stored-value card 10, and more particularly, to the financial account or financial record associated with stored-value card 10, at the retail store or over the Internet (i.e. via the website). Upon playing with stored-value card 10 at 226, redeeming stored-value card 10 at 228, or adding value to stored-value card 10 at 230, the current bearer of stored-value card 10 subsequently can perform any of operations 226, 228, or 230 as desired. In one embodiment, the ability of the current bearer to repeat redeeming stored-value card 10 at 228 is limited by whether the financial account or financial record associated with stored-value card 10 has any remaining value stored or recorded therein at the time of attempted redemption.

Although described above as occurring at a single retail store or website, in one embodiment, purchasing stored-value card 10 at 222, redeeming stored-value card 10 at 228, and adding value to stored-value card 10 at 230, can each be performed at any one of a number of stores adapted to accept stored-value card 10 or over the Internet. In one example, a number of stores are each part of a chain or similarly branded stores. In one example, a number of stores include at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a financial account or financial record associated with a stored-value card. The balance associated with the stored-value card declines as the card is used, encouraging repeat visits. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. For example, other stored-value card structures including movable graphic portions may be used. Other modifications within the scope of the invention and its various embodiments will be apparent to those of ordinary skill.

What is claimed is:

1. A stored-value card comprising:
a substrate including an account identifier and a graphical depiction of a character, the account identifier linking the stored-value card to at least one of a financial account and a financial record, wherein the substrate is substantially planar;
wherein the substrate defines an aperture configured to receive a portion of a finger of a card bearer and where the aperture is positioned relative to the character such that, when the finger is received by the aperture, the finger appears as an appendage of the character; and
wherein the aperture is a first aperture and the finger of the card bearer is a first finger, the stored-value card comprising a second aperture configured to receive at least a portion of a second finger of the card bearer such that, when the first and second fingers are received by the first and second apertures, the first and second fingers appear as first and second appendages of the character.

2. The stored-value card of claim 1, wherein the aperture is substantially circular and has a diameter of at least about 1.5 cm.

3. The stored-value card of claim 1, wherein the account identifier is included on a first surface of the substrate, and the graphical depiction of the character is included on a second surface of the substrate opposite the first surface.

4. The stored-value card of claim 1, wherein the first appendage is a leg.

5. The stored-value card of claim 1, wherein the account identifier includes a bar code.

6. The stored-value card of claim 1, wherein the substrate includes at least one of brand indicia and redemption indicia.

7. The stored-value card of claim 1, wherein the character is one of an animal, a person, a toy, and a fictional being.

8. The stored-value card of claim 1, in combination with a backer configured to wrap the stored-value card and defining a window, wherein the stored-value card is coupled to the backer such that the account identifier is viewable through the window.

9. The combination of claim 8, wherein the backer includes instructional indicia configured to be at least partially viewed through the first aperture of the stored-value card.

10. The stored-value card of claim 9, wherein the backer is initially positioned to extend over the first and second apertures preventing the first and second fingers of the card bearer from being placed through the first and second apertures, and the stored-value card is readily removable from the backer to allow the first and second fingers of the card bearer to each be placed through respective ones of the first and second apertures to appear as first and second appendages of the character.

11. The stored-value card of claim 1, wherein the substrate defines a front substantially planar surface opposite a rear substantially planar surface, the graphical depiction of the character is included on the front substantially planar surface of the substrate, and each of the first and second apertures extends from the front substantially planar surface to the back substantially planar surface such that the substrate is configured to receive the first and second fingers, which are part of a hand of the card bearer, such that the first finger extends through the first aperture and the second finger extends through the second aperture, and the first and second fingers both extend at least partially in front of the front substantially planar surface while a remainder of the hand is positioned behind the rear substantially planar surface.

12. The stored-value card of claim 11, wherein the second aperture is spaced from the first aperture, and the first aperture and the second aperture are each positioned off-center with respect to an overall length and an overall width of the substrate.

13. The stored-value card of claim 1, wherein the substrate is substantially rectangular, and the first aperture is positioned off-center with respect to an overall length and an overall width of the substrate.

14. The stored-value card of claim 1, wherein the first aperture and the second aperture are each located proximate to a substantially linear edge of the substrate such that the first finger and second finger are able to extend beyond the substantially linear edge of the substrate when received by the first aperture and the second aperture.

15. The stored-value card of claim 1, wherein the first aperture and the second aperture are each located proximate to a substantially linear edge of the substrate such that the first finger and second finger are able to curl around the substantially linear edge of the substrate when received by the first aperture and the second aperture.

16. The stored-value card of claim 1, wherein the substrate forms a shape including a length and a width, wherein the first aperture and the second aperture are each located at a position on the substrate such that the first aperture and the second aperture are centered with respect to the length and off-centered with respect to the width.

17. The stored-value card of claim 16, wherein:
the substrate is substantially planar and defines two opposing lateral edges and a longitudinal edge extending between the two opposing lateral edges,
the length is defined between the two opposing lateral edges,
the first and second apertures are each located proximate to the longitudinal edge of the substrate such that the first and second fingers are able to extend beyond and wrap around the longitudinal edge of the substrate when received by the first and second apertures, and
the first and second apertures are each positioned closer to the longitudinal edge than to each other.

18. A finger puppet comprising:
means for depicting a subject;
means for receiving a first naked finger of a bearer such that the first naked finger of the bearer serves and appears as a first animated portion of the subject;
means for receiving a second naked finger of the bearer such that the second naked finger of the bearer serves and appears as a second animated portion of the subject, wherein the means for receiving the second naked finger is separate and spaced from the means for receiving the first naked finger; and
means for linking the means for depicting to a financial account or record.

19. The finger puppet of claim 18, wherein the means for depicting a subject is a substantially planar member printed with the subject.

20. The finger puppet of claim 19, wherein the planar member is wallet-sized.

21. The finger puppet of claim 18, wherein the means for linking is included on the means for depicting.

22. The finger puppet of claim 18, wherein the means for linking includes a bar code.

23. The finger puppet of claim 18, wherein the means for receiving the first naked finger and the means for received the second naked finger are each defined through the means for depicting and are each positioned adjacent the subject.

24. The finger puppet of claim 18, in combination with means for supporting the finger puppet for display in a retail setting, wherein the means for supporting includes means for permitting access to the means for linking through the means for supporting.

25. The finger puppet of claim 18, in combination with a supporting member, wherein the supporting member is coupled to the finger puppet and includes instructions for using the finger puppet, the supporting member is positioned relative to the finger puppet such that the instructions are at least partially viewable through at least one of the means for receiving the first naked finger and the means for receiving the second naked finger.

26. The finger puppet of claim 25, wherein the instructions are at least partially viewable through both of the means for receiving the first naked finger and the means for receiving the second naked finger.

27. The finger puppet of claim 18, wherein:
the means for receiving the first naked finger and the means for receiving the second naked finger are each located proximate to a substantially linear edge of the means for depicting the subject such that the first naked finger and second naked finger are able to extend beyond and curl around the substantially linear edge when received by the means for receiving the first naked finger and the means for receiving the second naked finger; and
the means for depicting the subject forms a shape including a length and a width, wherein the means for receiving the first naked finger and the means for receiving the second naked finger are each located at a position on the substrate such that the means for receiving the first naked finger and the means for receiving the second naked finger are centered with respect to the length and off centered with respect to the width.

28. A method of encouraging purchase and facilitating use of a financial transaction card, the method comprising:
displaying a financial transaction card including an account identifier linking the financial transaction card to a financial account or record, the financial transaction card including a character depiction and including at least one opening configured to receive at least a portion of a human finger of a financial transaction card bearer, such that when the finger is received by the at least one opening, the finger appears as a portion of the character depiction, wherein displaying the financial transaction card includes informing potential consumers that the financial transaction card functions as a finger puppet; and
activating the financial transaction card to permit deductions from the financial account or record.

29. The method of claim 28, further comprising receiving the financial transaction card as payment for goods or services, at least a portion of a value of the goods or services being deducted from the financial account or the financial record.

30. The method of claim 28, wherein displaying the financial transaction card includes displaying the financial transaction card coupled to a backer such that the backer supports the financial transaction card while on display.

31. The method of claim 28, wherein the displaying the financial transaction card includes showing a potential consumer that the financial transaction card is substantially planar, defines a front surface opposite a rear surface with the character depiction being included on the front surface of the financial transaction card, and defines the at least one opening to extend from the front surface to the back surface of the financial transaction card, and wherein the financial transaction card is configured to receive the portion of the human finger, which is part of a human hand, through the at least one opening in a manner allowing the finger to at least partially extend in front of the front surface of the financial transaction card while a remainder of the human hand remains behind the rear surface of the financial transaction card.

32. The method of claim 31, wherein the at least one opening is a first opening configured to receive the human finger, which is a first human finger, and displaying the financial transaction card comprises showing the potential consumer a second opening defined by the financial transaction card and showing the potential consumer that each of the first opening and the second opening are positioned off-center with respect to an overall length and an overall width of the financial transaction card, and wherein the second opening is configured to receive at least a portion of a second human finger of the human hand such that, when the first finger and the second finger are each received by respective ones of the first opening and the second opening of the financial transaction card, the character depiction is configured to visually correspond with the first finger and the second finger such that the first finger appears as a first appendage of the character depiction and the second finger appears as a second appendage of the character depiction.

33. The method of claim 28, wherein displaying the financial transaction card includes showing potential consumers that the financial transaction card is substantially rectangular and defines the at least one opening in an off-center position with respect to an overall length and an overall width defined by the financial transaction card.

34. The method of claim 28, wherein informing potential consumers that the financial transaction card functions as a finger puppet includes providing visual promotional information regarding non-transactional use of the finger-puppet on a carrier, wherein the carrier is coupled to the financial transaction card to support the financial transaction card and is positioned such that the visual promotional information is at least partially viewable through the at least one opening.

35. The method of claim 28, wherein:
the at least one opening is located proximate to a substantially linear edge of the financial transaction card such that the portion of the human finger is able to extend beyond and curl around the substantially linear edge of the financial transaction card when received by the at least one opening; and
the financial transaction card forms a shape including a length and a width, wherein the at least one opening is located at a position on the financial transaction card such that the at least one opening is centered with respect to the length and off-centered with respect to the width.

36. A combination comprising:
a stored-value card comprising:
a substrate including an account identifier and a graphical depiction of a character, the account identifier linking the stored-value card to at least one of a financial account and a financial record, wherein the substrate is substantially planar, and the substrate defines an aperture configured to receive a portion of a finger of a card bearer and where the aperture is positioned relative to the character such that, when the finger is received by the aperture, the finger appears as an appendage of the character; and
a backer supporting the stored-value card, wherein the backer includes instructional indicia regarding use of the stored-value card as a finger puppet, and the instructional indicia is positioned to be at least partially viewed through the aperture of the substrate.

37. The combination of claim 36, wherein:
the aperture is located proximate to a substantially linear edge of the substrate such that the finger is able to extend beyond and curl around the substantially linear edge of the substrate when received by the aperture; and
the substrate forms a shape including a length and a width, wherein the aperture is located at a position on the substrate such that the aperture is centered with respect to the length, and off-centered with respect to the width.

38. A combination comprising:
a finger puppet comprising:
means for depicting a subject,
means for receiving a first finger of a bearer such that the first finger of the bearer serves as a first animated portion of the subject,
means for receiving a second finger of the bearer such that the second finger of the bearer serves as a second animated portion of the subject, wherein the means for receiving the second finger is separate and spaced from the means for receiving the first finger, and
means for linking the means for depicting to a financial account or record; and
a supporting member, wherein the supporting member is coupled to the finger puppet and includes instructions for using the finger puppet, the supporting member is positioned relative to the finger puppet such that the instructions are at least partially viewable through at least one of the means for receiving the first finger and the means for receiving the second finger.

39. The finger puppet of claim 38, wherein the instructions are at least partially viewable through both of the means for receiving the first finger and the means for receiving the second finger.

40. The combination of claim 38, wherein:
the means for receiving the first finger and the means for receiving the second finger are each located proximate to a substantially linear edge of the means for depicting the subject such that the first finger and second finger are able to extend beyond and curl around the substantially linear edge when received by the means for receiving the first finger and the means for receiving the second finger; and
the means for depicting the subject forms a shape including a length and a width, wherein the means for receiving the first finger and the means for receiving the second finger are each located at a position on the substrate such that the means for receiving the first finger and the means for receiving the second finger are centered with respect to the length, and off- centered with respect to the width.

* * * * *